(12) United States Patent
McCauley

(10) Patent No.: US 9,749,515 B2
(45) Date of Patent: Aug. 29, 2017

(54) SYSTEM AND METHODS FOR WIRELESS REMOTE CONTROL OVER CAMERAS WITH AUDIO PROCESSING TO GENERATE A REFINED AUDIO SIGNAL

(71) Applicant: Jack J. McCauley, Danville, CA (US)

(72) Inventor: Jack J. McCauley, Danville, CA (US)

( * ) Notice: Subject to any disclaimer, the term of this patent is extended or adjusted under 35 U.S.C. 154(b) by 0 days.

(21) Appl. No.: 13/769,773

(22) Filed: Feb. 18, 2013

(65) Prior Publication Data
US 2013/0250134 A1    Sep. 26, 2013

Related U.S. Application Data

(60) Provisional application No. 61/600,698, filed on Feb. 19, 2012.

(51) Int. Cl.
*H04N 5/232* (2006.01)

(52) U.S. Cl.
CPC ..... *H04N 5/23203* (2013.01); *H04N 5/23206* (2013.01); *H04R 2410/01* (2013.01); *H04R 2410/05* (2013.01); *H04R 2410/07* (2013.01); *H04R 2499/11* (2013.01)

(58) Field of Classification Search
CPC ................................ G04B 47/00; H04N 5/232
USPC ............... 348/211.1–211.11, 211.99; 368/10; 396/56
See application file for complete search history.

(56) References Cited

U.S. PATENT DOCUMENTS

| | | | |
|---|---|---|---|
| 5,193,117 A * | 3/1993 | Ono | H04R 3/005 381/92 |
| 6,359,837 B1 * | 3/2002 | Tsukamoto | 368/10 |
| 6,449,431 B1 * | 9/2002 | Cuddeback et al. | 396/27 |
| 7,327,396 B2 * | 2/2008 | Schultz et al. | 348/375 |
| 8,311,236 B2 * | 11/2012 | Kanamori | H04R 3/005 348/207.99 |
| 2003/0025802 A1 * | 2/2003 | Mayer et al. | 348/211.99 |
| 2004/0032509 A1 * | 2/2004 | Owens | H04N 5/21 348/222.1 |
| 2004/0066457 A1 * | 4/2004 | Silverstein et al. | 348/211.3 |

(Continued)

OTHER PUBLICATIONS

Korean Intellectual Property Office, ISA/KR, "International Search Report and Written Opinion" in PCT Application No. PCT/US2013/026613, Jun. 20, 2013, 11 pages.

*Primary Examiner* — Twyler Haskins
*Assistant Examiner* — Akshay Trehan
(74) *Attorney, Agent, or Firm* — Kang S. Lim

(57) ABSTRACT

Systems and methods for wireless remote control operation of cameras are provided. This system includes a remote controller which includes an interface for receiving commands from a user (such as turning on or off a camera), and a transceiver for transmitting the commands to one or more camera transceivers which are coupled to cameras. The remote controller may also include a display that indicates battery levels, camera status and even video feeds. Camera status and video feeds are transmitted from the camera transceiver which is coupled to the camera via an electrical bus interface. It may include a video converter that accepts raw video data from the camera and converts it into a video feed that is transmitted. Additionally, the camera transceiver may include an advanced audio circuit which subtracts measured pressure data from audio feeds to cancel out wind sounds.

16 Claims, 7 Drawing Sheets

(56) References Cited

U.S. PATENT DOCUMENTS

| | | | |
|---|---|---|---|
| 2005/0063553 A1* | 3/2005 | Ozawa | H04R 3/005 381/92 |
| 2007/0109417 A1* | 5/2007 | Hyttfors et al. | 348/211.99 |
| 2008/0101625 A1* | 5/2008 | Fazzio | H04R 3/04 381/92 |
| 2008/0211915 A1* | 9/2008 | McCubbrey | 348/159 |
| 2008/0219470 A1* | 9/2008 | Kimijima | H04S 1/002 381/92 |
| 2008/0317261 A1* | 12/2008 | Yoshida et al. | 381/94.1 |
| 2009/0066798 A1* | 3/2009 | Oku et al. | 348/207.99 |
| 2010/0060747 A1* | 3/2010 | Woodman | G03B 17/02 348/222.1 |
| 2010/0085645 A1* | 4/2010 | Skiver et al. | 359/604 |
| 2010/0118158 A1 | 5/2010 | Boland et al. | |
| 2010/0225758 A1 | 9/2010 | Mashiah | |
| 2011/0004329 A1 | 1/2011 | Wilson | |
| 2011/0050925 A1* | 3/2011 | Watanabe | H04N 5/23203 348/211.2 |
| 2011/0063461 A1* | 3/2011 | Masuda | 348/208.11 |
| 2011/0096168 A1 | 4/2011 | Siann et al. | |
| 2012/0007981 A1 | 1/2012 | Guerrera | |
| 2012/0162471 A1* | 6/2012 | Sekiya et al. | 348/231.4 |
| 2013/0119255 A1* | 5/2013 | Dickinson et al. | 250/340 |
| 2013/0315038 A1* | 11/2013 | Ferren | G06K 9/3266 367/197 |

\* cited by examiner

SYSTEM AND METHODS FOR WIRELESS REMOTE CONTROL OVER CAMERAS WITH AUDIO PROCESSING TO GENERATE A REFINED AUDIO SIGNAL

CROSS REFERENCE TO RELATED APPLICATIONS

This non-provisional application claims priority to U.S. provisional application No. 61/600,698, filed on Feb. 19, 2012, entitled "System and Methods for Wireless Remote Control over Cameras", which application is incorporated herein in its entirety by this reference.

BACKGROUND

The present invention relates to the remote operation of video, and still cameras and audio recording equipment. In particular, for Point of View (POV) style filming, or when more than one recording instrument is being controlled by a single individual, it is difficult and cumbersome to manually control the devices. As such, remote control over these recording devices may be of particular utility.

"Sport" cameras have become more popular in a number of outdoor and "extreme" activities. These cameras are typically small, lightweight units capable of being mounted on a helmet, surfboard, airplane, or other surface. This enables the filmmaker to capture images from their own perspective (known as POV filming).

For these cameras there is a continual tradeoff between size/weight and storage and power capacity. Often these units are being employed in places where power and external storage is not readily available. Given this tradeoff, it is advantageous for the user to record only when desired in order to conserve memory and power in the device. When the cameras are mounted on a hard to reach location such as a helmet (for example), rapid and easy control over the camera may be a difficult task.

Likewise, it is sometimes desirable to have more than one camera recording a single event where only one user is present. For example, in a stunt plane, the user may have more than one camera in the cockpit, wings and other locations in order to "get all the action." In these cases, remote control over the cameras' operations is desirous (if not entirely required).

In order to solve these, and similar issues, a number of solutions have been employed to varying degrees of success. Timers and remote triggers have been previously employed for cameras. In some cases, these remote triggers use infrared (IR) signals, or other frequencies, that the camera is designed to accept in order to take a picture, or start video recording. While these systems have been generally well received, they fail to provide the high degree of flexibility and customizability desired by most current sports filmmakers.

Hence there is a need for a system that provides for long distance and modular control over a sports camera. Such a system allows for a user to control one or more cameras from a convenient location without the need to be in the proximity of any of the recording devices.

In view of the foregoing, systems and methods for wireless remote controlled operation of cameras is provided. The present invention provides a novel system for controlling one or more recording devices using modular transceiver devices.

SUMMARY

The present invention discloses systems for remote operation of cameras and other recording devices. More particularly, the present invention teaches systems and methods for wireless remote control operation of action/sport cameras.

In some embodiments, a mountable wireless remote controller is disclosed. This remote controller in useful for use in conjunction with at least one camera transceiver coupled to a video recorder. The mountable wireless remote controller includes an interface for receiving commands from a user (such as turning on or off a camera), and a transceiver for transmitting the commands to one or more camera transceivers which are coupled to cameras. The remote controller may also include loops for accepting an elastic band for mounting the device, or an adhesive backing for semi-permanent mounting to a hard surface.

The mountable wireless remote controller may also include a display that indicates battery levels, camera status and even video feeds. Camera status and video feeds are transmitted from the camera transceiver. The camera transceiver is coupled to the camera via an electrical bus interface. It may include a video converter that accepts raw video data from the camera and converts it into a video feed that is transmitted. Additionally, the camera transceiver may include an advanced audio circuit.

The audio processing system includes one or more microphones, a pressure sensor and a processing unit. The pressure sensor may include a piezo sensor, and it measures changes in wind pressure. This pressure data may be used by the processor to remove wind sounds picked up by the microphone(s) using noise cancellation algorithms. In some cases the pressure sensor data may be weighted and subtracted from particular frequencies of the audio feed.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

In the drawings, like reference numerals are sometimes used to designate like structural elements. It should also be appreciated that the depictions in the figures are diagrammatic and not to scale.

DETAILED DESCRIPTION

The present invention will be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates generally to systems and methods for the remote operation of one or more recording devices. In particular, the wireless remote operation system is configured to work in conjunction with existing sports camera devices in order to provide unparalleled control over devices in the field.

While much of this application will reference the system in association with "sports" or "action" cameras, a wide range of recoding devices are considered as being within the scope of the invention. Typically, sport cameras are designed for durability, light weight, compact size and mount-ability. These cameras are unsurpassed in their ability to capture point of view (POV) filming perspective. However, due to their typical placement and intended usage, the ability to manually control these devices is often difficult, which is why the present systems are so well suited to use in conjunction with sports cameras. However, it is important to note that any other camera device, audio recording device, or the like are all considered to be within the scope of this disclosure. Thus, while the term "camera" may be utilized routinely within the specification in reference to sports cameras, it is intended that this term extend to other devices may be reasonably utilized in conjunction with the remote operating system.

I. System

Figure 1A:
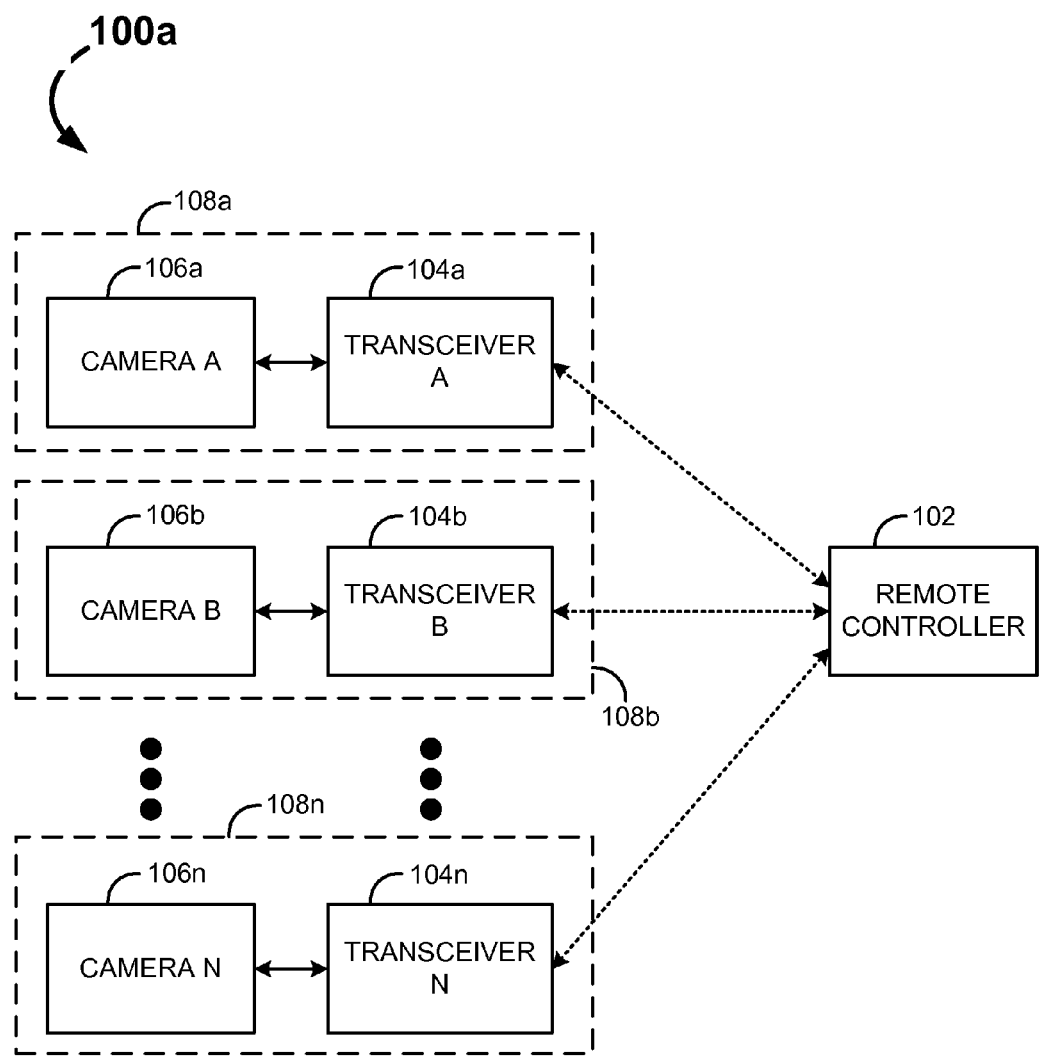
FIG. 1A is an example illustration of a system for an ad hoc network for controlling more than one camera remotely from a single remote controller, in accordance with an embodiment of the present invention.

To facilitate discussion, FIG. 1A is an example illustration of a system for an ad hoc network for controlling more than one camera 106a to 106n remotely from a single remote controller 102, shown generally at 100a. In this example embodiment, the remote controller 102 wirelessly communicates to each of the transceivers 104a to 104n. The transceivers 104a to 104n couple directly to the more than one camera 106a to 106n. The cameras 106a to 106n and transceivers 104a to 104n may be collocated within a housing or case 108a to 108n.

In some embodiments, the transceivers 104a to 104n may merely be receiver units capable of receiving input signals transmitted from the remote controller 102. The transceivers 104a to 104n also may include an internal video convertor, audio circuit, an internal battery and radio unit/transmitter. The remote controller 102 may be able to indicate to the cameras 106a to 106n via the camera transceivers 104a to 104n when to start recording and stop recoding. Additional commands, such as zooming, may also be signaled.

In alternate embodiments, the communication is bilateral between the remote controller 102 and the camera transceivers 104a to 104n. In these embodiments, the camera transceivers 104a to 104n may provide back to the remote controller 102 information such as record time, battery levels, or even video feeds.

In circumstances where the remote controller 102 is able to operate a plurality of cameras 106a to 106n, the cameras may be grouped for communal control, or may be controlled independently. The level of control granularity may be configured by the user as is desired for any particular application. For example, a skier may have a helmet mounted camera, as well as groups of cameras strategically located along a ski run. The skier may be able to individually or group control cameras in order to get a continual video clip, from multiple angles, of a ski jump, in this example.

The ad hoc network generated between the remote controller 102 and the camera transceivers 104a to 104n may utilize radio signals of any acceptable frequency. In some embodiments, radio frequencies in the Industrial, Scientific and Medical (ISM) radio band may be utilized. Under many conditions, the range of operability between the remote controller 102 and the camera transceivers 104a to 104n may be approximately 100 feet. Operable range may be impacted by transmission power, frequency of transmission, and the environment (i.e. obstacles).

Figure 1B:
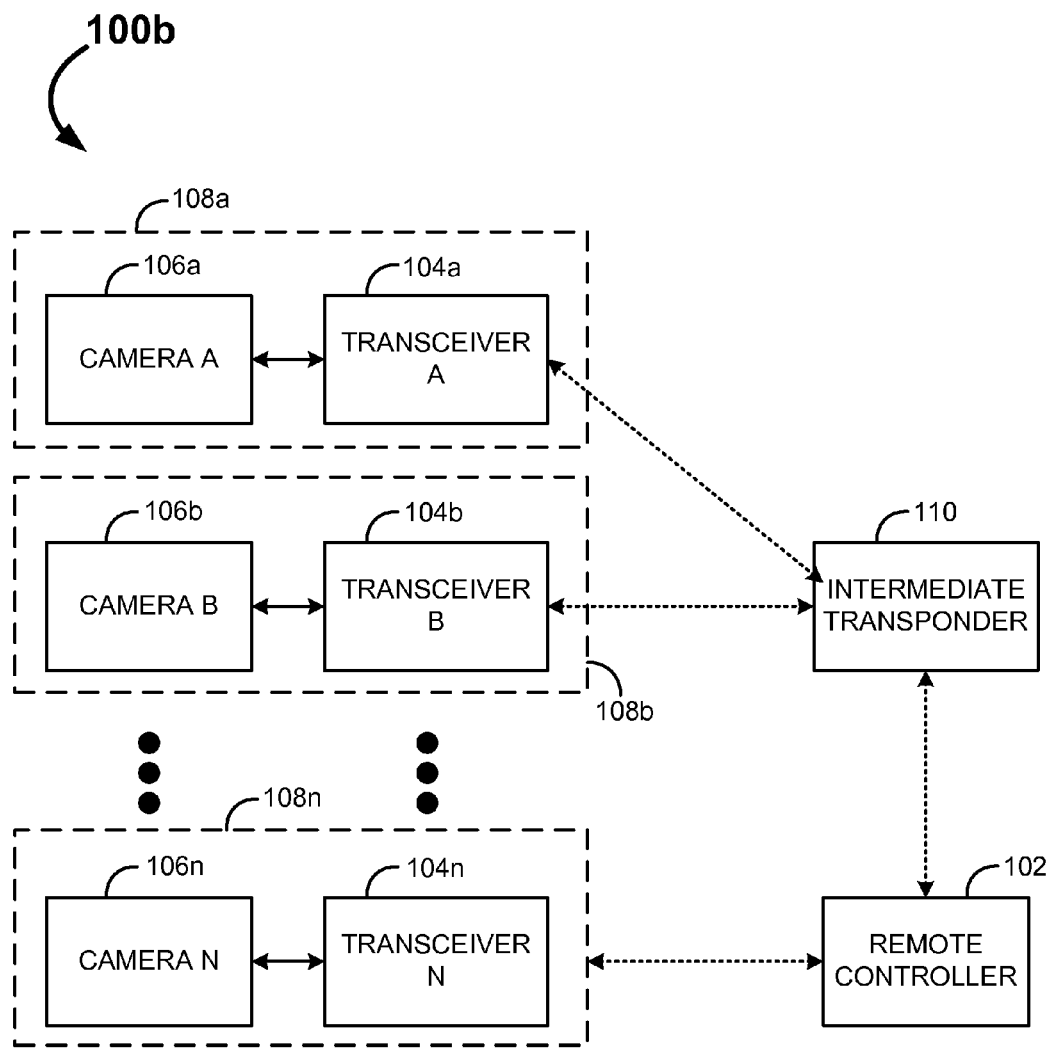
FIG. 1B is an example illustration of a system for long range controlling over more than one camera remotely from a single remote controller, in accordance with an embodiment of the present invention.

In contrast, FIG. 1B is an example illustration of a system for longer range controlling over more than one camera 106a to 106n remotely from a single remote controller 102, shown generally at 100b. In this example illustration an additional intermediate transponder 110 may be employed in order to relay the communications between the remote controller 102 and some transducers 104a and 104b. The intermediate transponder 110 may be a commercially available Wi-Fi access point, other radio frequency relay, or network intermediate (such as the internet). Further, in some embodiments, the intermediate transponder 110 may be a plurality of relays. Of note, in this example embodiment, the remote controller 102 is also seen directly communicating with at least one camera transceiver 104n.

Figure 2:
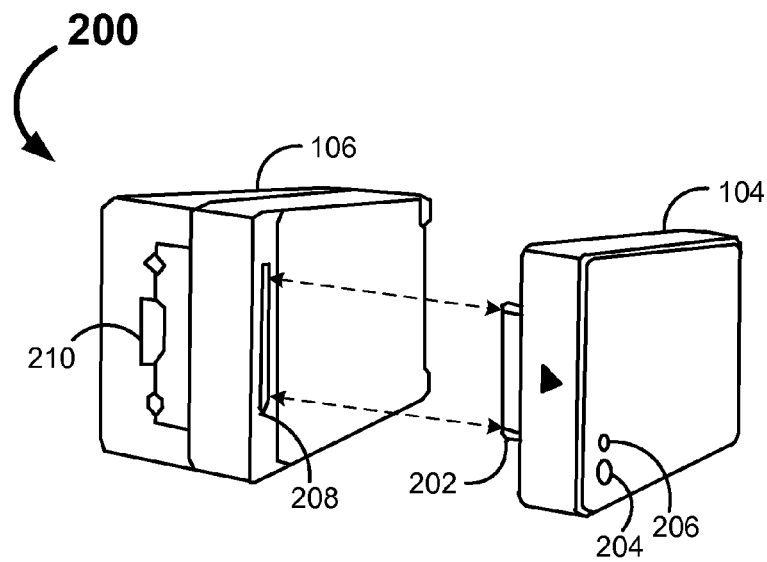
FIG. 2 is an example illustration of a camera and transceiver unit, in accordance with an embodiment of the present invention.

FIG. 2 is an example illustration of a camera 106 and camera transceiver 104 unit, shown generally at 200. In this illustration, a Hero™ sports camera is illustrated. This sports camera includes a bus port 208 on the back side of the camera 106. On the side is seen a mini USB port for connectivity of the camera 106 to a computer system.

A bus connector 202 located on the camera transceiver 104 is capable of engaging the bus port 208 of the camera 104. The camera transceiver 104 also may include a synchronization button 206 and an indicator light 204. The synchronization button 206 is utilized to synchronize the camera transceiver 104 to the remote controller 102.

Figure 3:
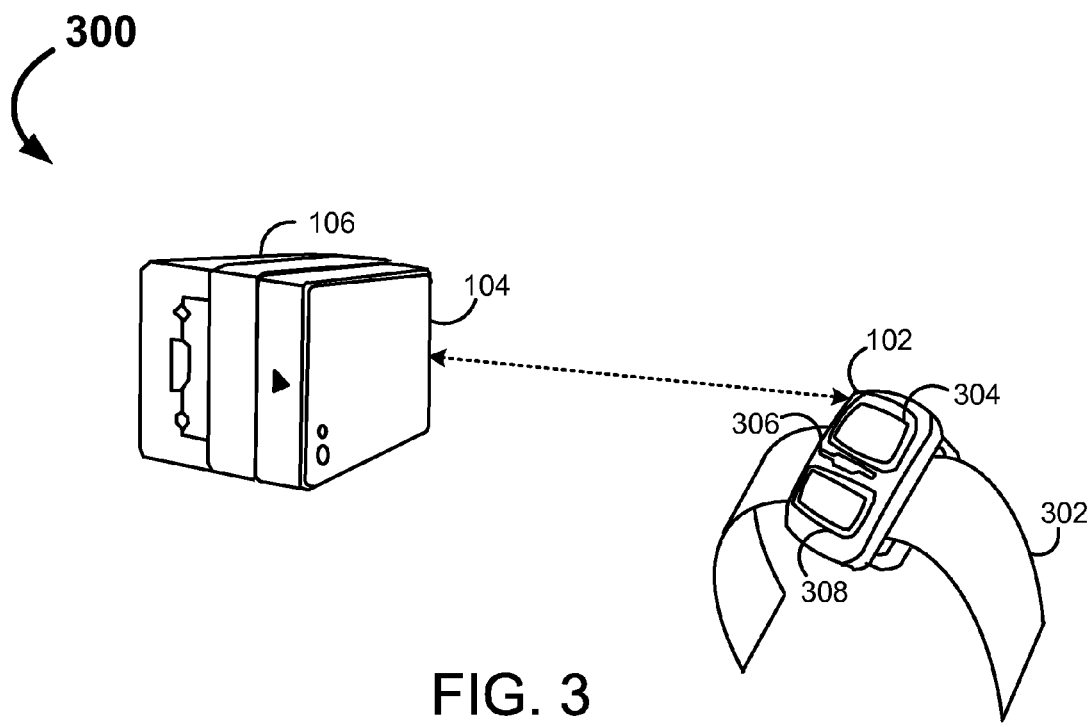
FIG. 3 is an example illustration of the camera and transceiver unit in communication with the remote controller, in accordance with an embodiment of the present invention.

FIG. 3 is an example illustration of the camera 106 and camera transceiver 104 unit in communication with the remote controller 102, seen generally at 300. The remote controller 102 may include a series of buttons 304 and 306 to specify when to turn the camera 106 on or off. The buttons 304 and 306 may be simultaneously depressed in order to indicate synchronization to the remote controller 102. The remote controller 102 may also have an indicator light 306 which indicates the camera 106 status. In some embodiments, additional controls and a more complicated display may be present on the remote controller 102. For example, a small LED or LCD screen may indicate to the user camera status, power/battery levels, and even display live video feeds.

The remote controller 102 may include a strapping system 302 for connecting to the user's forearm or other location for easy access. The strapping system may include elastic elements as well. Alternatively, the remote controller 102 may fit into an adhesive holder for permanent, or semi-permanent, mounting of the remote controller 102 to a surface.

II. Improved Audio Circuit

Figure 4:
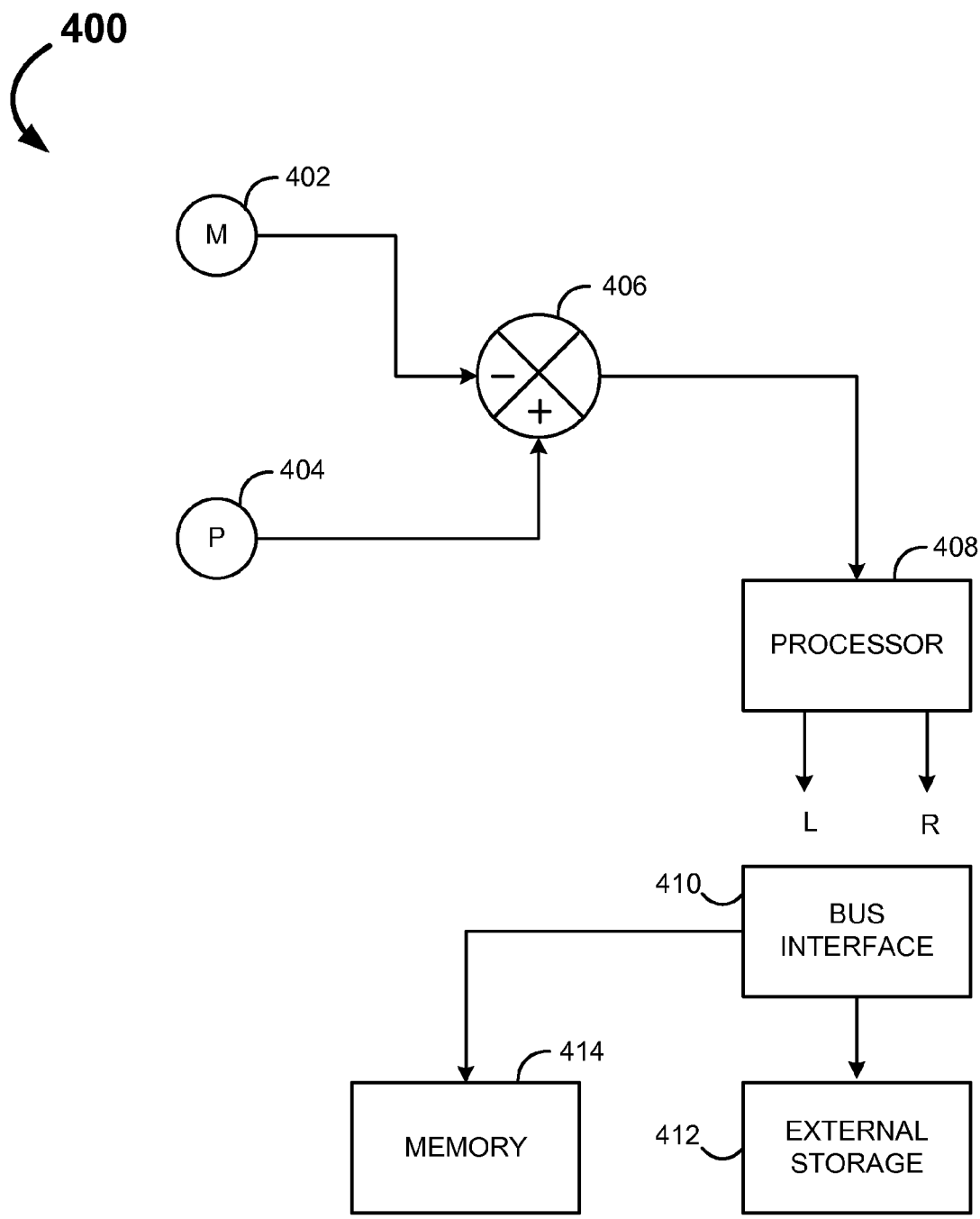
FIG. 4 is a logical diagram of an improved audio circuit, in accordance with an embodiment of the present invention.

FIG. 4 is a logical diagram of an improved audio circuit, shown generally at 400. Variants of this example audio circuit may be incorporated into the camera transceiver 104. Generally, sports cameras 106 have less than optimal audio recording capabilities. Therefore it may be advantageous to augment the audio recording capabilities of the camera 106 with the improved audio circuit.

The audio circuit includes one or more microphones 402 and a pressure sensor 404. The pressure sensor may be a piezo or other micro-electrical mechanical system (MEMS) optimized for a particular frequency domain. The pressure sensor's 404 signal is combined with that of the microphone(s) 402 in a multiplexer 406 and the result is provided to a processor 408 for analysis.

The microphones 402 receive audio signals and pressure fluctuations caused by wind. The pressure sensor 404 picks up changes in pressure due to wind. The processor 408 uses these feeds to perform noise cancellation of the microphone 402 feeds using the pressure sensor 404 data. Since often sports cameras are used in outdoor and windy environments (i.e., skiing, sky diving, surfing, biking, etc.) wind pollution of the audio feed is a consistent issue. By utilizing a pressure sensor feed, this noise pollution can be scrubbed from the final audio output in order to improve audio clarity.

The processor outputs the noise-corrected audio signal to a bus interface 410. Typically, the outputted audio is a stereo format; however, depending upon number of microphones, and processing performed, surround sound and other audio channels may be outputted. The bus interface 410 may output the signal for internal storage on memory 414, and to external storage 412 (such as an SD card).

III. Casing System

FIGS. 5A to 5D are example illustrations for the replacement of a camera cover or case 108, in accordance with an embodiment of the present invention. Camera covers are used for sports cameras 106 to protect the device, and for camera positioning. In many circumstances the case 108 is mounted to an article (such as a helmet) in a permanent fashion. The camera 106 is then inserted into the case 108 in order to secure it in place. The case may shield the camera from the elements, and even be waterproof if desired.

Figure 5A:
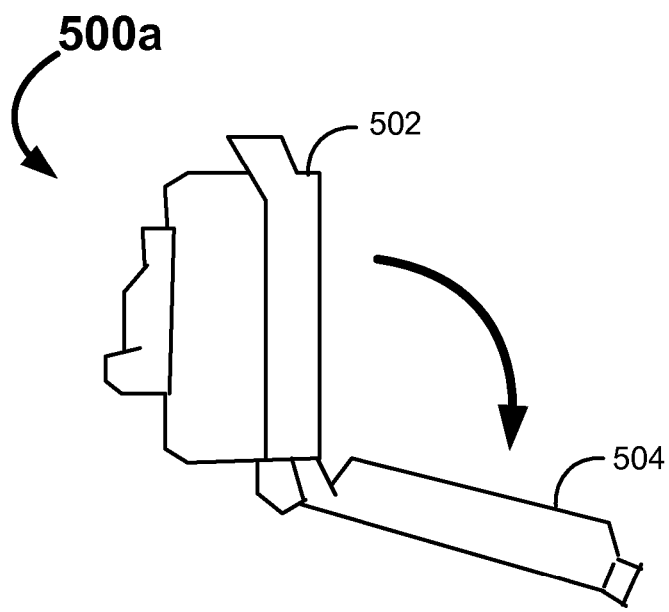
FIGS. 5A to 5D are example illustrations for the replacement of a camera cover, in accordance with an embodiment of the present invention.
Figure 5B:
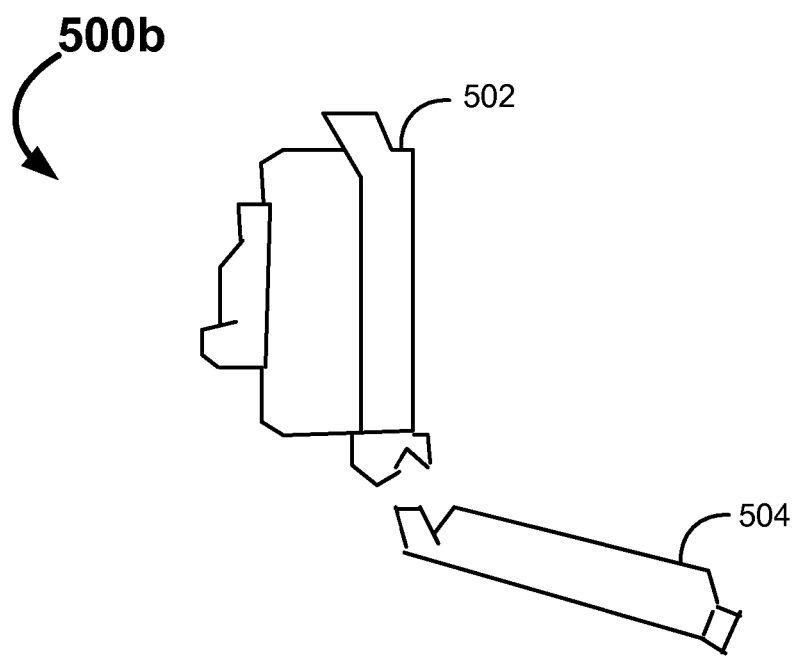

The casing 108 is generally a clamshell design, whereby the camera 106 may be accessed by opening the case backing FIG. 5A illustrates a side view of a traditional casing being opened, at 500a. The front of the case 502 hinges open from the traditional rear access panel 504. The access panel 504 may be removed, as illustrated at FIG. 5B, shown generally at 500b.

Figure 5C:
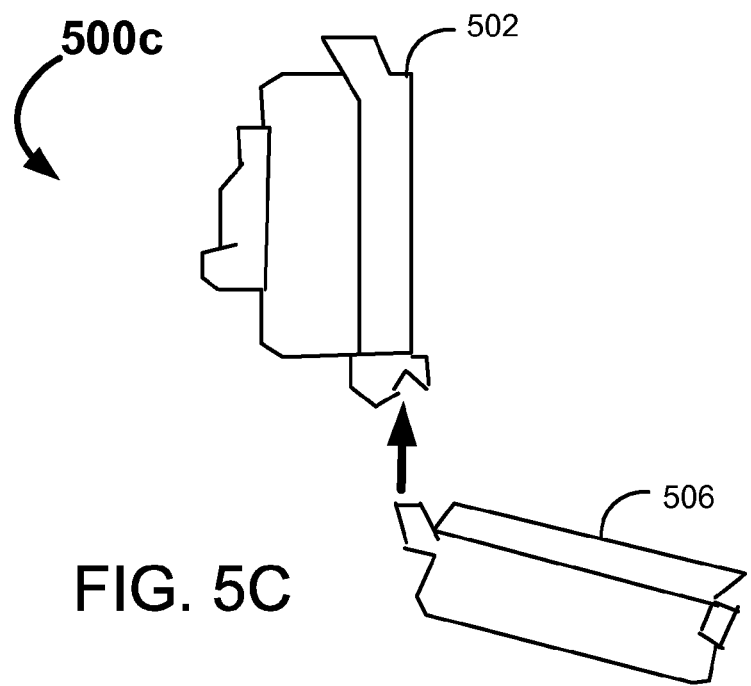
Figure 5D:
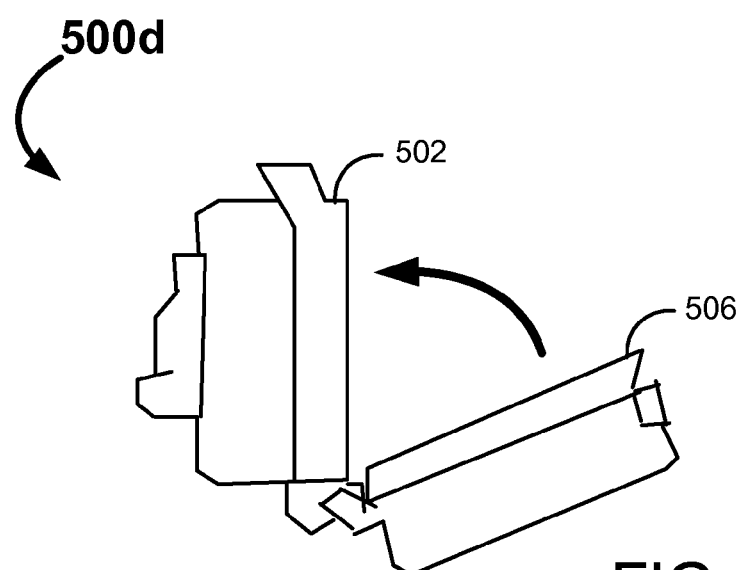

Next and extended capacity backing 506 may be attached to the front of the case 502, as illustrated at FIG. 5C, shown generally at 500c. The extended capacity backing 506 may then be shut like in a similar manner as the traditional backing in order to hold the camera and camera transceiver combination. The backing may include loopholes for mounting in some embodiments. Also, in some embodiments, the backing may be a "skeleton" backing, thereby allowing sound to more easily reach the microphones. For wet conditions, a solid backing may be utilized, and a gasket may form a watertight seal between the casing front and the backing.

IV. Methods of Operation

Figure 6:
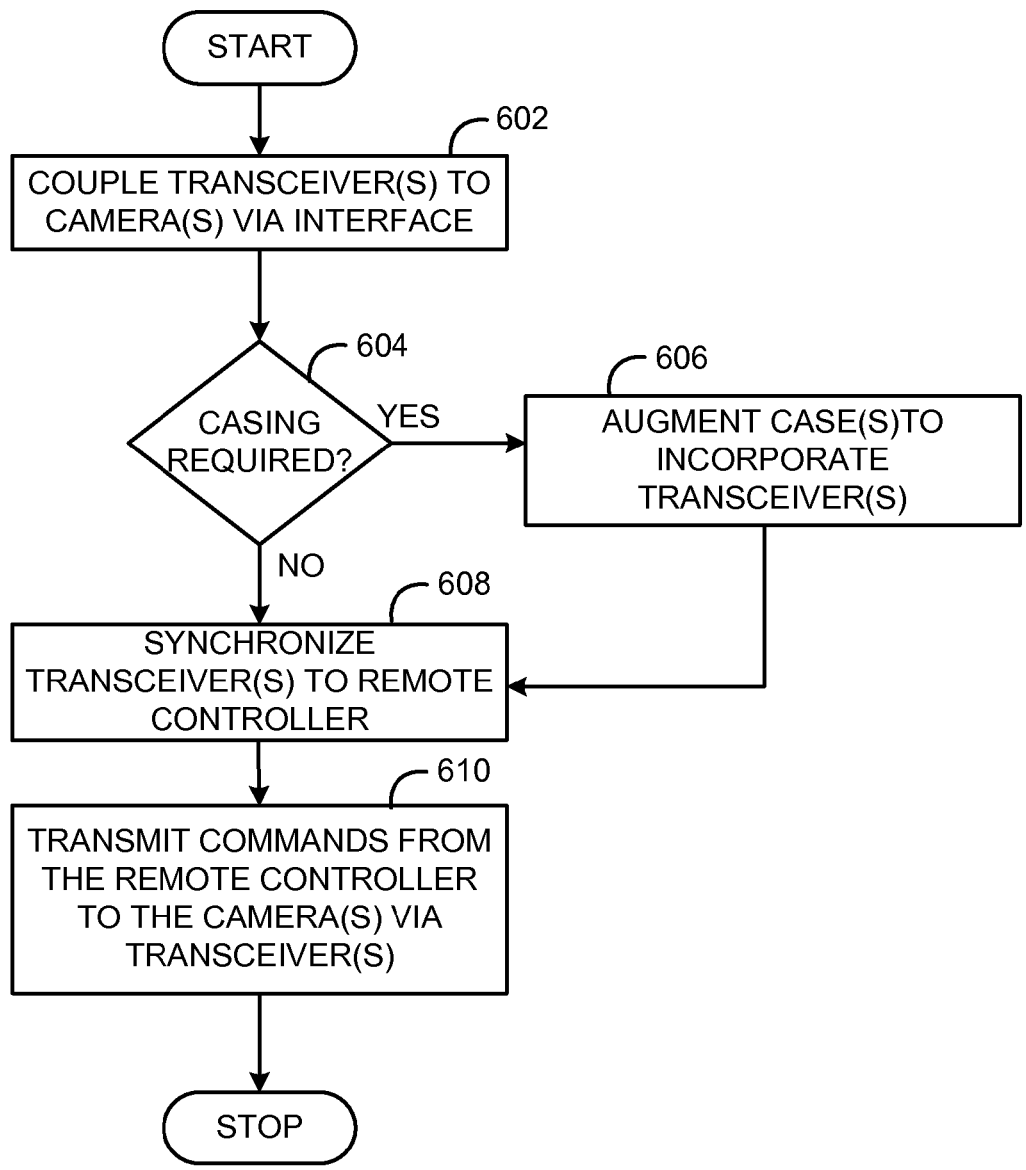
FIG. 6 is an example flowchart for the remote operation of a camera, in accordance with an embodiment of the present invention.

FIG. 6 is an example flowchart for the remote operation of a camera, in accordance with an embodiment of the present invention. In this example method, a camera transceiver is couple to each of the one or more cameras that are to be remotely operated (at 602). This coupling includes physically inserting the bus connector of the camera transceiver into the bus port of the camera. In some embodiments, the camera transceiver may be designed to clip to the camera's back in order to ensure a snug fit.

Next, an inquiry is made whether a casing is required (at 604). For most sports cameras a casing is utilized to hold the camera in place, and protect it. If a casing is required, the back of an existing case is augmented to incorporate the larger size of the camera transceiver (at 606). Cases are typically a clamshell design, and made of transparent plastic, such as acrylic. The back side of the clamshell can be removed and replaced by a larger backing, as discussed above.

If no casing is required, or after it has been modified, the camera transceiver is synchronized with the remote controller (at 608). Synchronization may be done by pressing synchronization buttons on both the camera transceiver(s) of interest and the remote controller while they are in close proximity to one another. This will cause the devices to ping one another, and establish a connection.

After the devices are synchronized data may be passed between the remote controller and the camera transceivers. This includes user commands, and device feeds, in some embodiments. At a minimum the remote controller provides information to the camera transceiver telling it when to turn on and off (or when to record). Additionally, other commands may be provided (at 610), in other embodiments, such as zooming, panning or other known actions. Further, in some embodiments, the camera transceiver may provide data regarding the camera to the remote controller. This data may include any of battery levels, camera status, audio data and video feeds. The remote controller may display this information on a display, such as LED indicators or an LCD display common to many mobile devices.

In sum, systems and methods for remote operation of a recording device are disclosed. These systems enable users to more easily control video and audio recording equipment in a sports or outdoor setting. This assists in the generation of point of view (POV) filmmaking, and provides the user the ability to easily manipulate devices that are often unreachable or difficult to operate manually.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A camera control system, useful for use in conjunction with at least one camera transceiver coupled to a video recorder, the camera control system comprising:
  a mountable wireless remote controller including:
    an interface configured to receive commands from a user, wherein the commands include turning on at least one camera, turning off the at least one camera, and grouping more than one camera for communal control into a plurality of groups, and wherein the commands are individual commands for a single camera of the at least one camera and a plurality of group commands, wherein each group command controls one of the plurality of groups for simultaneous communal control of the cameras within the given group based on user configuration; and
    a transceiver configured to transmit the commands to at least one camera transceiver, wherein the at least one camera transceiver is coupled to the at least one camera;
  an audio processing system comprising at least one microphone configured to transduce sound waves into a raw audio signal, a piezo pressure sensor optimized for a frequency domain associated with wind pressure configured to measure pressure differentials due to wind, wherein the pressure sensor generates a pressure signal, and a processor configured to subtract the pressure signal from the raw audio signal to generate a refined audio signal; and
  an electrical bus interface configured to couple to the bus port of the at least one camera, wherein the bus interface provides the refined audio signal to the at least one camera.

2. The camera control system of claim 1, wherein the mountable wireless remote controller further comprises loops configured to accept a band enabling the mountable wireless remote controller to mount on the user, and wherein the band includes elastic material.

3. The camera control system of claim 1, wherein the interface includes a display.

4. The camera control system of claim 3, wherein the interface includes a battery level indicator on the display received from each of the at least one camera transceiver.

5. The camera control system of claim 1, wherein the transceiver is further configured to receive information from the camera via the at least one camera transceiver.

6. The camera control system of claim 1, wherein the mountable wireless remote controller further comprises an adhesive mounting bracket for mounting the mountable wireless remote control.

7. The camera control system of claim 1, wherein the at least one camera is housed in a remote housing having
  a protective clamshell case, including a front and a backing, configured to receive the at least one camera, and wherein the backing of the protective clamshell case houses
  the at least one camera transceiver.

8. The camera control system of claim 7, wherein the electrical bus interface is further configured to couple to more than one peripheral device.

9. The camera control system of claim 7, wherein the remote camera housing further comprises a battery configured to be rechargeable.

10. The camera control system of claim 9, wherein the battery is further configured to supply energy to the camera.

11. The camera control system of claim 9, wherein the battery is recharged through the electrical bus interface.

12. The camera control system of claim 7, wherein the remote camera housing further comprises an internal video converter.

13. The camera control system of claim 12, wherein the at least one camera transceiver is further configured to transmit camera status and a video feed.

14. The camera control system of claim 13, wherein the camera transceiver transmits the video feed to a remote transceiver that couples to a remote portable viewing screen.

15. The camera control system of claim 13, wherein the at least one camera transceiver transmits the video feed to a distribution point, wherein the distribution point is linked to remote viewers.

16. The camera control system of claim 15, wherein the remote viewers are configured to access the video feed via a wireless network.

* * * * *